Nov. 17, 1953     L. W. FAGG ET AL     2,659,233
DYNAMOMETER APPARATUS
Filed April 28, 1951     3 Sheets-Sheet 1
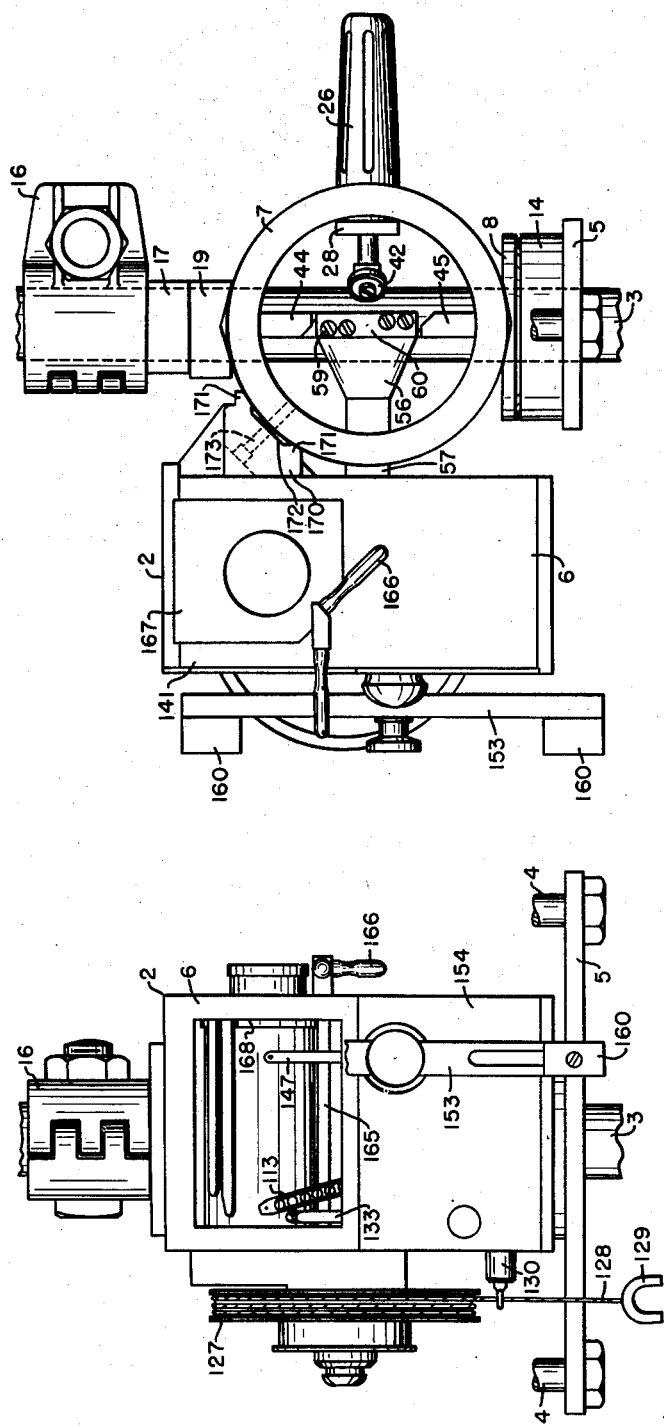
INVENTOR.
D.O. Johnson
L.W. Fagg
BY
ATTORNEY Nov. 17, 1953  L. W. FAGG ET AL  2,659,233
DYNAMOMETER APPARATUS
Filed April 28, 1951  3 Sheets-Sheet 2

INVENTOR.
D.O. Johnson
L.W. Fagg
BY
C. M. McKnight
ATTORNEY

Nov. 17, 1953　　　L. W. FAGG ET AL　　　2,659,233
DYNAMOMETER APPARATUS
Filed April 28, 1951　　　　　　　　　　　　3 Sheets-Sheet 3
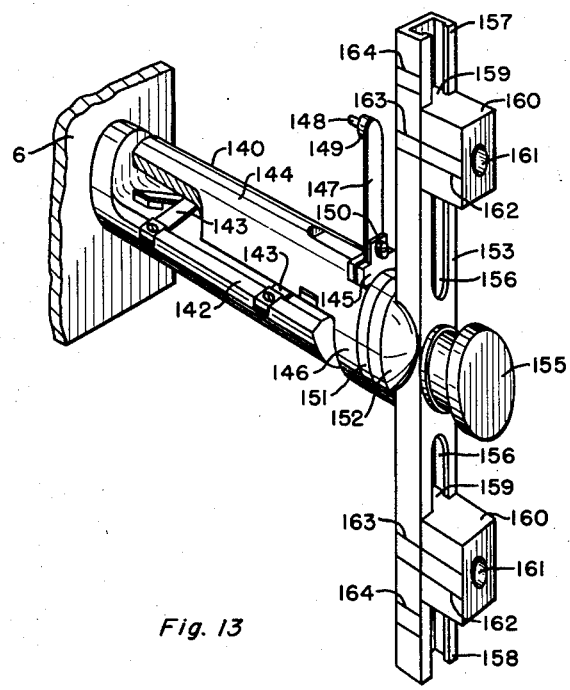
Fig. 13
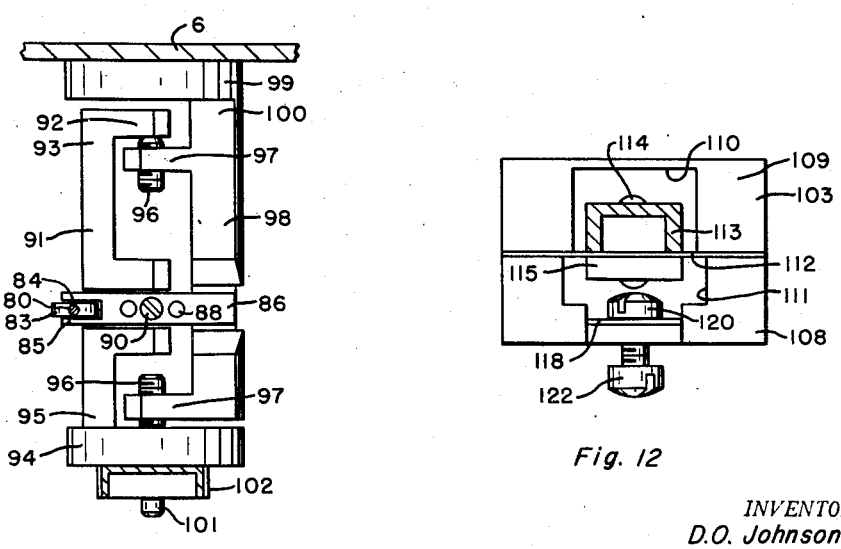
Fig. 11
Fig. 12
INVENTOR.
D.O. Johnson
L.W. Fagg
BY
C. McKnight
ATTORNEY Patented Nov. 17, 1953

2,659,233

UNITED STATES PATENT OFFICE 2,659,233

DYNAMOMETER APPARATUS

Leo Wayne Fagg and Douglas O. Johnson, Tulsa, Okla., assignors to Johnson-Fagg Engineering Company, Tulsa, Okla., a partnership Application April 28, 1951, Serial No. 223,610

7 Claims. (Cl. 73—141)

This invention relates to improvements in force measuring devices, and more particularly, but not by way of limitation, to a mechanical dynamometer for measuring and recording the load characteristics of an oil well pump polish rod.

This invention contemplates a novel mechanical dynamometer utilizing a bifurcated proving ring as the force measuring medium. The proving ring is adapted to straddle the polish rod of an oil well pump and is adapted to be placed in compression along one diameter thereof. Two pairs of struts are connected to the proving ring and are arranged along the diameter of the ring under compression to transmit the deflection of the ring to a main lever. The main lever magnifies the deflection of the proving ring, and transmits the magnified deflection to a recording stylus. The stylus records the magnified deflection of the proving ring on an indicator card carried by a cylindrical drum adapted to be rotated in timed relation to the movement of the polish rod. A timing bar is also provided to time the cycle of operation of the polish rod through the medium of a separate recording stylus on the indicator card.

An important object of this invention is to provide a practical mechanical dynamometer for measuring the load characteristics of an oil well pump polish rod.

Another object of this invention is to provide a mechanical dynamometer, the sensitivity of which will be essentially unaffected by temperature changes.

Another object of this invention is to provide a dynamometer for measuring the load characteristics of an oil well pump polish rod wherein no slack will occur in the recording linkage at a zero loaded condition during a cycle of the pump operation.

A further object of this invention is to provide a dynamometer for use on an oil well pump polish rod which will be unaffected by normal distortions of the polish rod or misalignment of the walking beam hanger.

A further object of this invention is to provide a novel holding handle for maintaining a ring type dynamometer in the correct position on a polish rod during all operating conditions.

Another object of this invention is to provide a mechanical dynamometer wherein the magnification may be easily and conveniently changed for varying load conditions.

Another object of this invention is to provide a mechanical dynamometer capable of utilizing various sizes of proving rings.

A still further object of this invention is to provide a sensitive yet durable mechanical dynamometer which may be economically manufactured.

Other objects and advantages of the invention will be evident from the following detailed description, read in conjunction with the accompanying drawings, which illustrate my invention.

In the drawings:

Figure 1 is a front elevational view of a novel dynamometer installed on an oil well pump polish rod.

Figure 2 is a side elevational view of the dynamometer shown in Fig. 1.

Figure 3 is a rear elevational view of a pair of novel aligning washers.

Figure 4 is a cross-sectional view taken along line 4—4 of Fig. 3.

Figure 5 is a rear elevational view of a pair of novel aligning blocks.

Figure 6 is a cross-sectional view taken along line 6—6 of Fig. 5.

Figure 11 is a plan view of the main stylus supporting mechanism.

Figure 12 is a horizontal cross-sectional view of the main stylus taken above the main stylus adjusting support.

Figure 13 is a perspective view of the timing mechanism.

Figure 9:
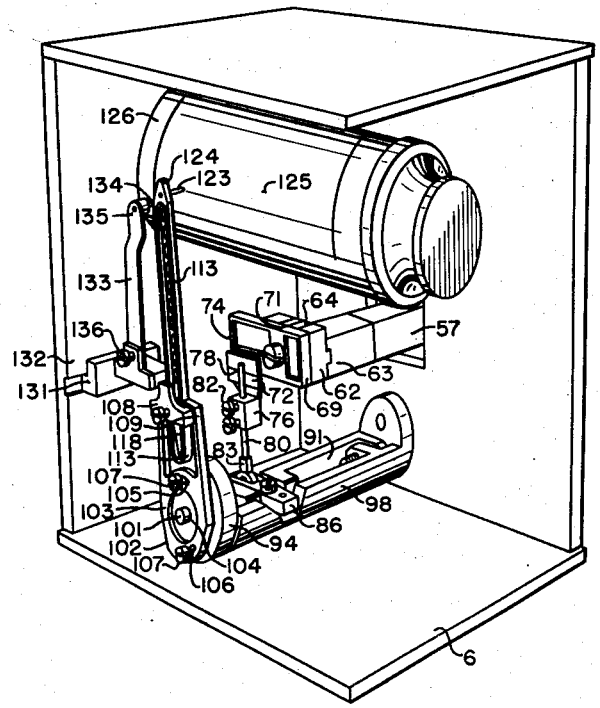
Figure 9 is a perspective view of the recording mechanism with portions removed.

Referring to the drawings in detail, and particularly Figures 1 and 2, reference character 2 generally designates a novel dynamometer disposed on a polish rod 3 of an oil well pump (not shown). The polish rod 3 is normally reciprocated by a walking beam (not shown) through the medium of a hanger 4. A clamp (not shown) is usually clamped to the rod 3 above the lower member 5 of the hanger 4 to connect the rod 3 to the hanger.

The dynamometer 2 comprises a housing 6, containing the recording mechanism as will be hereinafter set forth, connected to an elastic bifurcated ring 7. The ring 7 is usually called a proving ring and is a device developed by the U. S. Bureau of Standards for calibrating testing machines. The ring 7 straddles the polish rod 3 and rests on a novel washer 8 (Figs. 3 and 4). A V-shaped groove 9 is provided in the upper surface 10 of the washer 8 to assure the correct loading of the ring 7 as will be hereinafter set forth. A transverse slot 11 is also provided in the washer 8 at right angles to the V-shaped groove 9 to loosely receive the polish rod 3. The lower surface 12 of the washer 8 is convex and conforms to a portion of a sphere (not shown) to mate with the spherically shaped upper concave surface 13 of another washer 14. The washer 14 rests on the lower member 5 of the hanger 4 and is provided with a transverse slot 15 to loosely receive the polish rod 3.

A suitable rod clamp 16 (Figs. 1 and 2) is secured to the polish rod 3 in vertical spaced relation to the lower member 5 of the hanger 4. A spacer block 17 (see also Figs. 5 and 6) is disposed under the rod clamp 16, and has a transverse slot 18 therein to loosely receive the polish rod 3. The spacer block 17 in turn contacts an aligning block 19 disposed on top of the bifurcated ring 7. A V-shaped groove 20 is provided in the lower surface 21 of the block 19 to assure the load imposed on the polish rod 3 will be transmitted to the ring 7 along the true vertical diameter (not shown) thereof. A transverse slot 22 is provided in the block 19 at right angles to the V-shaped groove 20 to loosely receive the polish rod 3. The block 19 is connected to the ring 7 by suitable set screws (not shown), and the block 17 is connected to the block 19 by a plurality of dowel pins (not shown) to prevent any misalignment of the blocks 17 and 19 on the ring 7.

It will be apparent that the load imposed on the polish rod 3, by the weight of the pump rods (not shown) extending down into the well bore (not shown) and the column of oil (not shown) being pumped, will be transmitted to the ring 7 to deflect the ring along the vertical diameter thereof. In the event the lower member 5 of the hanger 4 is not exactly at right angles to the polish rod 3, or the polish rod 3 is slightly bent, the washer 8 will automatically move relative to the washer 14 to assure the imposition of the polish rod load along the vertical diameter of the ring 7. The cooperating spherical surfaces 12 and 13 of the washers 8 and 14 respectively, permit free movement of the washer 8 when the ring 7 is tilted to retain the washer 8 in contact with both halves of the bifurcated ring 7, thereby assuring a uniform loading of the ring. In addition, the V-shaped groove 9 in the washer 8, cooperating with the V-shaped groove 20 in the block 19, assures the imposition of the load along the vertical diameter of the ring 7.

Figure 7:
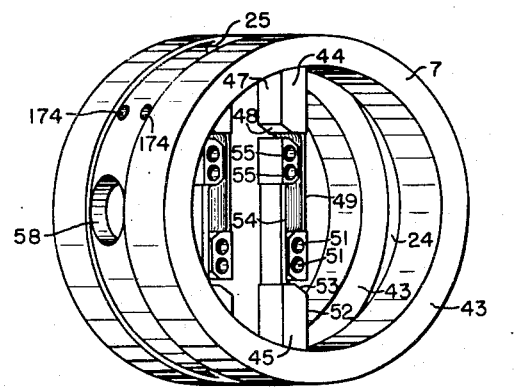
Figure 7 is a perspective view of a proving ring and struts therefor.

As previously set forth, the ring 7 is bifurcated, having a vertical slot 24 (Fig. 7) therein extending through slightly more than one half the diameter of the ring. The surfaces 25 of the ring 7 at the inner end of the slot 24 are semicircular and are adapted to slidingly contact the polish rod 3 when the ring 7 is placed thereon to permit slight movement of the ring relative to the polish rod when the ring is compressed. The ring 7 (Fig. 2) is retained in operating position on the polish rod 3 by a novel holding handle indicated generally at 26 and extending through the slot 24.

Figure 8:
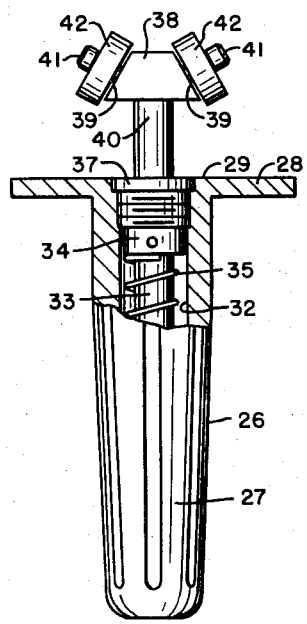
Figure 8 is a plan view of a novel holding handle partially in section for clarity.

The handle 26 (Fig. 8) comprises an essentially cylindrical housing 27 having a rectangular shaped flange 28 on one end 29 thereof. A longitudinal bore 32 extends partially through the housing 27 and communicates with the end 29 thereof. A rod 33 having a circumferential projection 34 around a medial portion thereof is reciprocally disposed in the bore 32. A helical spring 35 is disposed around the rod 33 with its opposite ends in contact with the inner end (not shown) of the bore 32 and the projection 34. The spring 35 constantly tends to force the rod 33 out of the bore 32 for purposes as will be hereinafter set forth. An apertured nut 37 is threadedly secured in the bore 32 around the rod 33 and is adapted to contact the projection 34 to prevent complete movement of the rod 33 out of the bore 32. A head 38, having tapered side faces 39, is secured on the outer end 40 of the rod 33. An axle 41 extends outwardly from each side face 39 of the head 38 to support a roller or wheel 42 adapted to contact the polish rod 3.

To place the handle 26 in operation, the rod 33 is turned in the housing 27 until the head 38 is disposed at right angles to the flange 28, whereupon the handle is inserted in the slot 24 of the ring 7 with the wheels 42 in contact with the opposite sides of the polish rod 3 as shown in Fig. 2. The housing 27 is then pushed inwardly against the action of the spring 35 and turned to turn the flange 28 in a horizontal position. When the housing 27 is released, the spring 35 forces the housing 27 outwardly until the flanges 28 contact the inner surfaces of the bifurcated ring portions 43 to maintain the ring 7 in assembly on the polish rod 3. In the event the ring 7 is caused to move up or down the polish rod 3, as when the supports for the ring fail for example, the wheels 42 merely roll along the polish rod 3 and retain the handle 26 in the correct position to maintain the ring 7 on the polish rod 3. The dynamometer 2 therefore will not be easily dislodged from the polish rod 3 and broken.

Referring again to Fig. 7, a pair of upper struts 44 and a pair of lower struts 45 are secured in the ring 7 along the vertical diameter thereof. The struts 44 and 45 are secured to the inner surface of the ring 7 by suitable set screws (not shown). The forward edge 47 of each of the upper struts 44 is cut away at 48 to provide a thinned or spring portion 49 in the central portion of the ring 7. A pair of vertically spaced transverse apertures 51 are provided in each strut 44 below the spring portion 49. The apertures 51 are disposed slightly to the rear of the vertical diameter (not shown) of the ring 7 for purposes as will be hereinafter set forth. The rear edge 52 of each lower strut 45 is cut away at 53 to provide a spring portion 54. A pair of vertically spaced transverse apertures 55 are also provided in each strut 45 above the spring portion 54. The apertures 55 are disposed forward of the vertical diameter of the ring 7.

The struts 44 and 45 are connected to a U-shaped extension 56 of a main lever 57 (Fig. 2). The lever 57 extends through an aperture 58 (Fig. 7) in the ring 7 into the recording mechanism housing 6 as will be more fully hereinafter set forth. The U-shaped extension 56 straddles the polish rod 3 and is disposed adjacent the inner sides of the struts 44 and 45. Apertures (not shown) are provided in the U-shaped extension 56 in aligned relationship with the apertures 51 and 55 in the struts 44 and 45 respectively to receive screws 59. The screws 59 extend through the U-shaped extension 56 and the respective struts 44 and 45 and are threadedly secured in apertured plates 60 disposed on the outer sides of the struts 44 and 45 and the inner sides of the U-shaped extension 56.

It will be readily seen that upon compression of the ring 7, the struts 44 will be moved downwardly and the struts 45 will be moved upwardly. However, since the free ends of the struts 44 and 45 are connected to the U-shaped extension 56 to preclude the free ends thereof from moving vertically, the struts will be bent at the spring portions 49 and 54 to pivot the main lever 57 in a clockwise direction (Fig. 2). The struts 44 and 45 are installed in the ring 7 slightly compressed or preloaded, for purposes as will be hereinafter set forth.

A head 62 (Fig. 9) is provided on the end 63 of the main lever 57 in the housing 6. Three (but not limited thereto) aligning grooves 64 are provided in the top surface of the head 62. An elongated transverse slot 65 (Fig. 10) is provided in the head 62 to receive a clamping nut 66. A second transverse slot 67 communicates with the slot 65 and is adapted to receive a rearwardly extending flange 68 of a clamping plate 69. The clamping plate 69 is secured to the head 62 by a screw 70 cooperating with the clamping nut 66. It will be apparent that the transverse position of the clamping plate 69 may be varied as desired by simply loosening the screw 70 and sliding the nut 66 in the slot 65 while simultaneously moving the plate 69. The flange 68 cooperating with the slot 67 precludes a turning movement of the plate 69 on the head 62. An aligning groove 71 (Fig. 9) is provided on the top surface of the plate 69 to cooperate with the aligning grooves 64 in positioning the plate 69 as will be more fully hereinafter set forth.

A thin flexure member 72 (Fig. 9) is secured to the plate 69 adjacent one side marginal edge 74 thereof. The flexure member 72 extends downwardly from the clamp 69 and is connected at its lower end to a connecting rod clamp 76. A vertical bore (not shown) is provided in the connecting rod clamp 76 to receive the upper end 78 of a connecting rod 80. The rod 80 is adjustably secured in the clamp 76 by a pair of set screws 82.

The lower end (not shown) of the connecting rod 80 is threadedly secured in a wrist connector 83 (see also Fig. 11). The wrist connector 83 is rotatably disposed on a pin 84 carried in the bifurcated end 85 of a magnification arm 86. Three (but not limited thereto) apertures 88 are provided in spaced relation in the magnification arm 86 to selectively receive a screw 90 for connecting the magnification arm 86 to a main stylus pivot support 91. A transversely extending arm 92 is provided on one end 93 of the support 91, and a circular shaped head 94 is provided on the opposite end 95 thereof. The support 91 is pivotally supported by a pair of pivot screws 96 engaging the arm 92 and the head 94. The pivot screws 96 are threadedly secured in a pair of longitudinally spaced arms 97 of a main stylus base support 98, in aligned relationship with the screw 90. A circular shaped head 99 is provided on the rear end 100 of the base support 98. The head 99 is suitably secured to the instrument housing 6 to support the base support 98 in a horizontal position. A shaft 101 extends outwardly from the circular head 94 of the pivot support 91 in alignment with the pivot screws 96 to support a main stylus, indicated generally at 102.

The main stylus 102 (Fig. 9) comprises a base portion 103 having an aperture 104 therein to receive the shaft 101. An arcuate slot 105 is provided in the base portion 103 above the aperture 104 and an arcuate slot 106 is provided below the aperture 104. The slots 105 and 106 are formed on the arc of a circle (not shown) having its center line in the center line of the aperture 104. Screws 107 extend through the slots 105 and 106 into the head 94 of the pivot support 91 to secure the main stylus 102 thereto. It will be apparent that the main stylus 102 may be turned to various angular positions on the shaft 101 upon loosening the screws 107. An adjustment support 108 is secured to the upper end 109 of the base portion 103. As clearly shown in Fig. 12, the upper end 109 of the base portion 103 is cut away at 110 and the adjustment support 108 is cut away at 111 to permit securing a thin flexure member 112 between the base portion 103 and the adjustment support 108. The main stylus arm 113 is secured to one side of the flexure member 112 by a screw 114. A pad 115 is provided on the opposite side of the flexure member 112 to receive the screw 114. The lower end of the main stylus arm 113 extends below the flexure member 112 and has a slot (not shown) therein to receive the lower end of a leaf type tension spring 118. The upper end of the spring 118 is secured by a screw 120 to the adjustment support 108. A set screw 122 is also secured in the adjustment support 108 in contact with the spring 118 and is utilized to vary the tension of the spring 118 as will be hereinafter set forth.

A pointer 123 is secured in the upper end 124 of the stylus arm 113 to record the movement of the main stylus 102 on an indicator card 125. The indicator card 125 is mounted on a drum 126 adapted to be driven through a system of reduction gearing (not shown) by a pulley 127 (Fig. 1) in the usual manner. A cord 128 is wrapped around the pulley 127 a plurality of times and may be secured to the well head (not shown) to cause rotation of the drum 126 during operation of the polish rod 3. A magnet 129 is secured to the free end of the cord 128 to facilitate the connection of the cord to the well head. During inoperation of the dynamometer 2, the cord 128 may be wound on the pulley 127 and the magnet 129 conveniently placed in contact with the blocks 17 and 19. A guide 130 is secured to the housing 6 to assure uniform winding of the cord 128 on the pulley 127 during operation of the dynamometer 2.

A suitable bracket 131 (Fig. 9) is secured to one side 132 of the housing 6 to support a base stylus 133 therein. The base stylus 133 extends upwardly from the bracket 131 to a position adjacent the drum 126. A pointer 134 is carried in the upper end 135 of the stylus 133 and is adapted to mark a base line (not shown) on the card 125 upon rotation of the drum 126 for purposes as will be hereinafter set forth. The stylus 133 is resilient to permit slight bending thereof without damage. A set screw 136 is carried by the bracket 131 in contact with the stylus 133 to vary the tension thereof and hence the pressure exerted by the pointer 134 on the indicator card 125.

A timing mechanism (Figs. 1, 2, and 13) indicated generally at 140 is disposed in the housing 6 adjacent the main stylus 102. The timer 140 comprises a base support 142 (Fig. 13) suitably secured to the back plate of the housing 6. Two sets of cross springs 143 interconnect the base support 142 with a vibrating support 144 in the usual manner. A stylus arm support 145 is provided on the outer end 146 of the vibrating support 144 to support a resilient stylus arm 147. The stylus arm extends upwardly from the support 145 and has a pointer 148 in the upper end 149 thereof adapted to contact the indicator card 125. A set screw 150 is carried by the support 145 in contact with the stylus arm 147 to vary the tension thereof and hence the pressure exerted by the pointer 148 on the indicator card 125. A circular shaped head 151 is also provided on the outer end 146 of the vibrating support 144. The head 151 is connected by an extension 152 to a novel timing bar 153. The extension 152 extends through an aperture (not shown) in an inspection door 154 provided on the lower front portion of the housing 6. A knobbed screw 155 secures the timing bar 153 and the extension 152 to the head 151.

Two T-shaped grooves 156 are provided in the upper and lower ends 157 and 158 of the timing bar 153. The grooves 156 communicate with the outer face of the bar 153 and are adapted to receive the T-shaped flanges 159 of a pair of weights 160. The weights 160 are secured to the bar 153 in various positions by set screws 161. A pair of aligning grooves 162 are provided in each weight 160 adapted to selectively match two sets of aligning grooves 163 and 164 provided on the bar 153. The sets of grooves 163 and 164 are provided in spaced relation on the bar 153 and indicate the number of cycles the stylus 147 will vibrate during a unit length of time upon actuation of the bar 153. For example, when the grooves 162 of the weights 160 are placed in line with the grooves 163, and the bar 153 is set into vibration, the stylus arm 147 will vibrate through ten complete cycles in each second until the bar 153 comes to rest. The grooves 164 may indicate seven and one half cycles per second. The indexing of the timing bar 153 eliminates all guesswork in determining the number of cycles the stylus arm 147 vibrates per second and reduces the hook-up time required to place the dynamometer 2 in operation. The pointer 148 will obviously produce a wave on the indicator card 125 during vibration of the arm 147, from which the velocity of the polish rod 3 may be determined.

A stylus lifting bar 165 (Fig. 1) extends through the housing 6, and is journaled (not shown) in the side walls 132 and 141 thereof. The lifting bar 165 is disposed adjacent the base stylus arm 133, the main stylus arm 113 and the timer stylus arm 147, and upon rotation thereof, all of the stylus arms are moved away from the drum 126 to disengage the respective pointers from the recording chart 125. The bar 165 is operated by a suitable handle 166 disposed on the outside of the housing 6 adjacent the side wall 141 thereof. The handle 166 may also be utilized to lock an inspection door 167 provided in the upper portion of the side wall 141 opposite the drum 126. An observation window 168 is preferably provided in the upper front portion of the housing 6 opposite the drum 126 to permit the operator to observe the action of the recording mechanism.

A mounting block 170 (Fig. 2) is provided on the upper rear portion of the housing 6 to facilitate the connection of the housing 6 to the ring 7. A pair of spaced projections 171 are provided on the outer tapered surface 172 of the block 170 and are adapted to contact the outer surface of the ring 7. A pair of screws 173 are carried by the block 170 between the projections 171 for connection in the threaded apertures 174 (Fig. 7) provided in the ring 7 at an angle of approximately forty five degrees. It will be readily apparent that the housing 6 may be secured through the medium of the mounting block 170 to various sizes of proving rings (not shown).

*Operation*

In operation of the dynamometer 2, the magnet 129 is secured to a fixed object such as the well head (not shown) to cause an oscillatory movement of the drum 126 and indicator card 125 in timed relation to the reciprocatory movement of the polish rod 3. As previously set forth, the load imposed on the polish rod 3 is transmitted to the ring 7, causing a compression of the ring along the vertical diameter thereof. The deflection of the ring 7 in turn bends the spring portions 49 and 54 of the struts 44 and 45 respectively, causing a pivotal action of the main lever 57 about the transverse center line (not shown) of the ring 7.

The head 62 and clamp 69 (Fig. 9) will therefore be swung in a vertical arc and will be moved a greater distance than the deflection of the ring 7, depending upon the length of the main lever 57. The movement of the clamp 69 is transmitted through the medium of the flexure member 72, rod clamp 76, rod 80, wrist connector 83 and pin 84 (see also Fig. 11) to the magnification arm 86. As the clamp 69 is moved by the lever 57, the clamp 69 obviously does not move in a true vertical direction, however, the rod 80 will bend slightly to cooperate with the flexure member 72, and prevent any stresses being induced in the magnification arm 86. Furthermore, the wrist connector 83 will pivot on the pin 84 to permit free pivotal movement of the magnification arm 86.

The magnification arm 86 provides a further magnification of the deflection of the ring 7. The degree of magnification produced by the arm 86 depends upon which aperture 88 receives the screw 90, as will more fully hereinafter be set forth. Since the magnification arm 86 is secured to the base pivot 91 by the screw 90, the pivot 91 is pivoted on the screws 96 simultaneously with the movement of the arm 86. The main stylus 102 is thereby pivoted about the center line of the shaft 101, causing the pointer 123 to move across the indicator card 125 and scribe a mark thereon. The main stylus 102, it will be noted, provides a still further magnification of the deflection of the ring 7, and the resulting magnified deflection is indicated on the card 125 through the medium of the pointer 123. The mark made by the pointer 123 during reciprocation of the polish rod 3 and the simultaneous rotation of the drum 126 represents the loads imposed on the polish rod 3 in the form of a closed diagram as is well known in the art.

Oil wells, as it is also well known, are of varying depths, therefore, the loads imposed on the various sucker rods will vary considerably. The present dynamometer 2 is sufficiently flexible, that it may be used on oil wells of any depth. Firstly, the ring 7 may be replaced with another proving ring (not shown) of the desired size. As previously set forth, the instrument housing 6 may be secured to various sizes of proving rings through the medium of the tapered mounting block 170 and the screws 173. The size of the proving ring 7 obviously determines the size of diagram (not shown) that will be produced on the indicator card 125.

Figure 10:
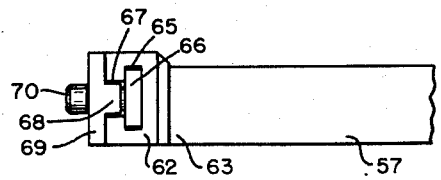
Figure 10 is a side elevational view of the free end of the main lever.

In the event the desired size of diagram is not produced on the card 125, the magnification of the ring 7 may be varied by varying the position of the magnification arm 86 (Fig. 9) on the base pivot 91 and the position of the clamp 69 on the head 62. To facilitate the adjustment of the magnification arm 86, the index marks 64 are provided on the head 62, and the mark 71 is provided on the clamp 69. The marks 64 correspond to the three positions in which the screw 90 may be disposed. In Fig. 9 for example, the mark 71 is aligned with the central mark 64 and the screw 90 is disposed in the central aperture 88. The rod 80 is thereby disposed in a true vertical position when the clamp 69 and the arm 86 are in their normal or zero positions. To decrease the magnification of the deflection of the ring 7, and hence produce a smaller diagram on the card 125, the arm 86 is moved to the left (Fig. 11) until the screw 90 may be disposed in the right hand aperture 88 and the clamp 69 is correspondingly moved to the left until the mark 71 is aligned with the left hand mark 64. The rod 80 will then again be in a vertical position to eliminate the possibility of dangerous strains being produced in the mechanism. To increase the size of the diagram on the card 125, the arm 86 and clamp 69 are moved to the right (Figs. 9 and 11).

It will be readily apparent that the deflection of the ring 7 may be magnified to any desired degree. In the commercial device, when the screw 90 is in the center aperture 88, the total combined magnification produced by the main lever 57, magnification arm 86, and main stylus 102 is approximately one hundred. The main stylus pointer 123 is therefore moved one hundred times as far as the actual deflection of the ring 7 to produce a relatively large diagram on the chart 125.

The angular position of the main stylus 102 may be varied on the head 94 of the base pivot 91 to vary the zero position of the pointer 123 by loosening the screws 107 (Fig. 9). In this manner, the diagram produced on the indicator card 125 may be drawn in the desired position. In addition, the force exerted by the pointer 123 on the card 125 may be varied as desired by turning the set screw 122 (Fig. 12). The set screw 122 varies the tension of the spring 118 which in turn controls the force exerted by the main stylus arm 113.

Simultaneous with the reciprocation of the polish rod 3 and rotation of the drum 126, the timing bar 153 (Figs. 1 and 13) is placed in vibration, causing the pointer 148 to scribe a time wave (not shown) on the indicator card 125. The time wave is utilized to determine the speed of the polish rod 3 and hence the time required for the well pump (not shown) to complete one cycle of operation. This information is in turn utilized to determine the horsepower requirements of the machinery (not shown) operating the well pump (not shown). The timing bar 153, and hence the pointer 148, may be vibrated any desired number of cycles a minute by correctly positioning the weights 160 as previously set forth.

The base stylus pointer 134 (Fig. 9) merely scribes a reference line (not shown) on the card 125 to facilitate the positioning of the zero setting of the main stylus 102. The stylus lifting bar 165 (Fig. 1) is utilized to lift the pointers 134, 123 and 148 off of the indicator card 125 when the well pump (not shown) is being operated to reach stable conditions. After the pump has been in operation for a short period, for example fifteen minutes, the lifting bar 165 is turned by use of the handle 166 to free the stylus arms 133, 113 and 147, whereupon the diagram is taken.

As previously set forth, the struts 44 and 45 are installed in the ring 7 slightly under compression. Therefore, no slack will occur in the recording linkage during operation, as when the load is completely removed from the ring 7. The struts 44 and 45 will be constantly retained in a slightly bent condition ready to rotate the main lever 57 immediately upon a deflection of the ring 7. It will be noted the struts 44 and 45 are connected to the ring 7 at the point of minimum stress and will not therefore interfere with the calculated deflection of the ring. It will also be noted that the aperture 58 is provided between the bifurcated portions 43 of the ring 7, therefore, the aperture 58 will not weaken the portions of the ring subject to deflections. Furthermore, the aperture 58 severs the central portion of the ring 7, i. e. the portion interconnecting the bifurcated portions 43, thereby precluding interference with the deflection of the portions 43. However, the central portion of the ring 7 does function to retain the portions 43 in assembly and to support the housing 6 as previously set forth.

From the foregoing it is apparent the present invention provides a practical mechanical dynamometer for measuring and recording the load characteristics of an oil well pump polish rod. The sensitivity of the dynamometer will be essentially unaffected by temperature changes and no slack will occur in the recording mechanism at a zero load condition during a cycle of operation. Furthermore, the accuracy of the dynamometer will not be affected by normal distortions of the polish rod or misalignment of the walking beam hanger. The degree of magnification produced by the recording mechanism may be varied as desired and the recording mechanism may be utilized with several different sizes of proving rings, thereby rendering the device applicable on any depth of oil wells. It is also apparent that the present invention provides a novel holding handle for a ring type dynamometer to efficiently retain the dynamometer in operating position on a polish rod.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. In a dynamometer comprising a bifurcated elastic ring providing two ring portions to receive a compressive force along one diameter thereof, a lever extending into the ring at right angles to the center line of the ring, a pair of struts connected to the inner periphery of each portion of the ring at substantially diametrically opposed points and extending inwardly in the ring along said one diameter thereof, a thinned portion in each of said struts parallel to the center line of the ring, means for connecting the free ends of said struts in a substantially perpendicular position to the lever to one end of the lever in spaced parallel chordal planes whereby upon compression of the ring the struts are bent at said thinned portions to pivot the lever about the center line of the ring, and a recording mechanism connected to the opposite end of the lever.

2. In a dynamometer comprising an elastic ring to receive a compressive force along one diameter thereof, a slot in the ring providing two ring portions, a lever extending into the ring opposite the slot at right angles to the center line of the ring, a pair of struts connected to the inner periphery of each ring portion at substantially diametrically opposed points and extending parallel to said one diameter of the ring, a portion of each strut being cut away in a direction parallel to the center line of the ring, the struts disposed in the ring substantially perpendicular to the lever and with the free ends connected to the lever in spaced parallel chordal planes, whereby upon compression of the ring the struts are bent to pivot the lever about the center line of the ring, and a recording mechanism connected to the opposite end of the lever.

3. In a dynamometer for measuring the force imposed on a pump polish rod, comprising a bifurcated elastic ring adapted to straddle the polish rod, a hanger for reciprocating the ring and polish rod, a clamp secured to the polish rod above the ring, a block between the upper surface of the ring and the clamp, a V-shaped groove in the lower surface of the block parallel to the center line of the ring, a washer in contact with the lower surface of the ring, a V-shaped groove in the upper surface of said washer parallel to the center line of the ring for cooperating with said first mentioned V-shaped groove in imposing the load of the polish rod along the true vertical diameter of the ring, a spherical lower surface on the washer, and a complementary spherical washer between said washer and the hanger.

4. In a dynamometer for measuring the force imposed on a pump polish rod, comprising a bifurcated elastic ring adapted to straddle the polish rod, a hanger for reciprocating the ring and polish rod, a clamp secured to the polish rod in contact with the ring to transmit the force exerted on the polish rod to the ring, means for recording the deflection of the ring, and a handle for retaining the ring in operating position on the polish rod, said handle comprising a housing, flanges on one end of the housing for gripping the inner surface of the bifurcated portions of the ring, a reciprocable rod in the housing extending toward the polish rod, rollers carried by the rod in contact with the polish rod, and a spring in the housing on the rod for forcing the rollers into contact with the polish rod and the flanges in contact with the ring.

5. In a dynamometer for measuring the force imposed on a pump polish rod, comprising a bifurcated elastic ring adapted to straddle the polish rod, a hanger for reciprocating the ring and polish rod, a clamp secured to the polish rod in contact with the ring to transmit the force exerted on the polish rod to the ring, means for recording the deflection of the ring, and a handle extending through the bifurcated portions of the ring for retaining the ring on the polish rod, said handle comprising a cylindrical housing, flanges on one end of the housing, a reciprocable rod in the housing and extending from said one end thereof, a tapered head on the extended end of the rod, rollers carried by the tapered head, and a spring anchored in the housing and to the rod for forcing the rollers into contact with the polish rod and the flanges into contact with the inner surface of the bifurcated portions of the ring.

6. In a dynamometer for measuring the load characteristics of a pump polish rod, comprising a bifurcated elastic ring adapted to straddle the polish rod, means for transmitting the load of the polish rod to the ring to deflect the ring, an instrument housing, a mounting block on the instrument housing, spaced lugs on the mounting block for contacting the outer periphery of the ring, a screw carried by the mounting block and adapted to enter the ring in a radial direction to force the lugs into contact with the ring and support the instrument housing, and recording means in the instrument housing connected to the ring to record the deflection of the ring.

7. In a dynamometer comprising a bifurcated elastic ring providing two ring portions to receive a compressive force along one diameter thereof, a lever extending into the ring portions, a pair of resilient struts disposed in the ring substantially perpendicular to the lever and parallel to one diameter of the ring, said struts connected to the inner periphery of each portion of the ring at substantially diametrically opposed points, the free end of said struts being connected to the end of the lever in spaced parallel chordal planes to pivot the lever upon deflection of the ring, and a recording mechanism connected to the opposite end of the lever.

LEO WAYNE FAGG.
DOUGLAS O. JOHNSON.

References Cited in the file of this patent

UNITED STATES PATENTS

| Number | Name | Date |
| --- | --- | --- |
| 753,015 | Tretch | Feb. 23, 1904 |
| 2,063,169 | Kemler | Dec. 8, 1936 |
| 2,346,281 | Templin | Apr. 11, 1944 |
| 2,522,117 | Holt et al. | Sept. 12, 1950 |